United States Patent [19]
Bretschneider et al.

[11] 3,821,230
[45] June 28, 1974

[54] SUBSTITUTED SULFONYL BORNANE-CARBOXAMIDES AND NONBORNANE CARBOXAMIDES

[75] Inventors: Hermann Bretschneider; Kraft Hohenlohe-Oehringen, both of Innsbruck, Austria; Andre Grüssner, Basel, Switzerland; Klaus Zur Nedden, Marl, Germany

[73] Assignee: Hoffman-La Roche Inc., Nutley, N.J.

[22] Filed: Oct. 10, 1972

[21] Appl. No.: 296,481

Related U.S. Application Data

[62] Division of Ser. No. 8,390, Feb. 3, 1970, Pat. No. 3,707,558.

[52] U.S. Cl.................. 260/293.56, 260/326.39
[51] Int. Cl............................................ C07d 29/34
[58] Field of Search................. 260/293.56, 326.3

[56] References Cited
UNITED STATES PATENTS
3,654,357   4/1972   Bretschneider et al......... 260/552 R FOREIGN PATENTS OR APPLICATIONS
902,881   8/1962   Great Britain

*Primary Examiner*—G. Thomas Todd
*Attorney, Agent, or Firm*—Samuel L. Welt; Bernard S. Leon; William G. Isgro

[57] ABSTRACT

Bicyclic carboxamide derivatives, prepared, inter alia, by reacting, for example, a camphor-3-carboxylic acid or noncamphor-3-carboxylic acid derivative with a sulfonic acid amide, are described. The bicyclic carboxamide derivatives are useful as hypoglycemic agents.

5 Claims, No Drawings

SUBSTITUTED SULFONYL BORNANE-CARBOXAMIDES AND NONBORNANE CARBOXAMIDES

CROSS-REFERENCE TO RELATED APPLICATIONS

This application is a division of U.S. patent application Ser. No. 8,390, filed Feb. 3, 1970 now U.S. Pat. No. 3,707,558.

BRIEF SUMMARY OF THE INVENTION

The invention relates to the preparation of bornanecarboxamide derivatives useful as hypoglycemic agents. More particularly, the invention relates to compounds of the formula

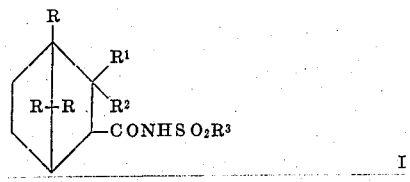

wherein the residues R are identical and are hydrogen or methyl, $R^1$ is hydrogen, $R^2$ is hydroxy, or $R^1$ and $R^2$, taken together, are the oxygen atom of a keto group (which can also be ketalized), and $R^3$ is phenyl; phenyl substituted by halogen, lower alkyl, lower alkoxy, lower alkylthio, amino, acylamino, acylamino-lower alkyl, cyano, carbamoyl or diacylimido; cycloalkyl; or a 5- or 6-membered N-linked nitrogen-containing heterocyclic residue, and salts thereof with pharmaceutically acceptable bases. The compounds of formula I are useful as hypoglycemic agents.

DETAILED DESCRIPTION OF THE INVENTION

The invention relates to bornanecarboxamides of the formula

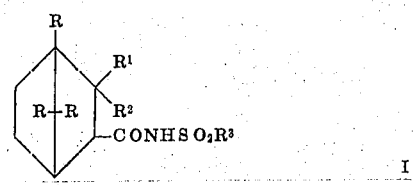

wherein the residues R are identical and are hydrogen or methyl, $R^1$ is hydrogen, $R^2$ is hydroxy, or $R^1$ and $R^2$, taken together, are the oxygen atom of a keto group (which can also be ketalized), and $R^3$ is phenyl; phenyl substituted by halogen, lower alkyl, lower alkoxy, lower alkylthio, amino, acylamino, acylamino-lower alkyl, cyano, carbamoyl or diacylimido; cycloalkyl; or a 5- or 6-membered N-linked nitrogen-containing heterocyclic residue and salts thereof with pharmaceutically acceptable bases.

Compounds of this invention corresponding to formula I are exemplified by the following:

(1R)-2-Oxo-N-(piperidinosulfonyl)-3-endobornanecarboxamide;

rac. 2-Oxo-N-(p-tolylsulfonyl)-3-bornanecarboxamide (mixture of endo and exo isomer);

(1R)-2-Oxo-N-(p-tolylsulfonyl)-3-endobornanecarboxamide;

Isomeric mixture of (1R)-2-exo-hydroxy-N-(p-tolylsulfonyl)-3-endobornanecarboxamide and (1R)-2-endohydroxy-N-(p-tolylsulfonyl)-3-exobornanecarboxamide;

Isomeric mixture of (1R)-2-endohydroxy-N-(p-tolylsulfonyl)-3-endobornanecarboxamide and (1R)-2-exohydroxy-N-(p-tolylsulfonyl)-3-exobornanecarboxamide;

(1R)-N-[(p-chlorophenyl)-sulfonyl]-2-oxo-3-endobornanecarboxamide:

(1R)-N-{[p-(methylthio)-phenyl]-sulfonyl}-2-oxo-3-endobornanecarboxamide sodium;

(1R)-N-{[p-(ethylthio)-phenyl]-sulfonyl}-2-oxo-3-endobornanecarboxamide sodium;

(1R)-N-{[p-(2-acetamidoethyl)-phenyl]-sulfonyl}-2-oxo-3-endobornanecarboxamide sodium;

(1R)-N-(N-acetylsulfanilyl)-2-oxo-3-endobornanecarboxamide sodium;

(1R)-2-oxo-N-sulfanilyl-3-endobornanecarboxamide sodium;

(1R)-N-[(p-carbamoylphenyl)-sulfonyl]-2-oxo-3-bornanecarboxamide sodium;

(1R)-N-[{p-[2-(5-chloro-o-anisamido)-ethyl]-phenyl}-sulfonyl]-2-oxo-3-endobornanecarboxamide; and (1R)-N-[(p-cyanophenyl)-sulfonyl]-2-oxo-3-endobornanecarboxamide.

As used herein, the term "alkyl" denotes preferably straight or branched chain lower alkyl groups having 1–6 carbon atoms, for example methyl, ethyl, propyl, isopropyl, butyl, phenyl, hexyl, and their isomers. The term "alkoxy" preferably denotes a lower alkyl ether group in which the lower alkyl group is as described above, for example, methoxy, ethoxy, propoxy, pentoxy, and the like. The term "alkylene" denotes a hydrocarbon group of 1–6 carbon atoms, for example, methylene, ethylene, propylene, butylene, pentylene, and the like. The term "halogen" denotes all the halogens, i.e., bromine, chlorine, fluorine and iodine; preferably, chlorine and bromine.

A halophenyl represented by $R^3$ is preferably chlorophenyl. The term "acyl" denotes an aliphatic or aromatic acyl residue, for example, an "alkanoyl" group derived from an aliphatic carboxylic acid of 1–7 carbon atoms, such as formyl, acetyl, propionyl, and the like; and an "aroyl" group derived from an aromatic carboxylic acid, such as benzoyl and the like.

Exemplary of acylaminophenyl are acetaminophenyl, benzoylaminophenyl and the like. Exemplary of diacylimidophenyl are phthalimidophenyl and the like. An acylaminoalkylphenyl residue is, for example, benzylaminoethylphenyl, which is substituted in the benzamide residue by lower alkoxy or halogen. Exemplary of 5- or 6-membered nitrogen-containing heterocyclic rings are piperidinyl and pyrrolidinyl. The term "cycloalkyl" preferably denotes a cyclo-lower alkyl group of 3–6 carbon atoms, for example, cyclopentyl, cyclohexyl and the like.

As ketals there come into consideration, for example, dialkyl ketals such as the dimethyl or diethyl ketals; or alkylene ketals such as the ethylene ketal.

The compounds of formula I can be prepared in accordance with the invention, by the following process variants:

(A) By reacting a reactive camphor-3-carboxylic acid or norcamphor-3-carboxylic acid derivative, in which the ring-located keto group can be ketalized, with a sulfonic acid amide of the formula $R^3$ '$SO_2NH_2$        II wherein R³' is R³ as described above wherein amino is protected,
or an alkali salt thereof; or (B) By reacting camphor-3-carboxylic acid, norcamphor-3-carboxylic acid or a camphor or norcamphor alkali salt, in which compounds the ring-located keto group can be ketalized, with a sulfonyl isocyanate of the formula $$R^3SO_2NCO \qquad \text{III}$$

and, if desired, removing the protecting groups from a protected amino group, saponifying a cyano group to carbamoyl, cleaving a ketal group, reducing a ring-located keto group to hydroxy, and/or converting the reaction product into a salt with a pharmaceutically acceptable base. The starting materials utilized in the process of the invention are known compounds or can be prepared according to known procedures.

The reaction of a compound of formula II or III with one of the named camphor or norcamphor derivatives is conveniently carried out in a suitable organic solvent, conveniently with heating. Suitable solvents comprise, for example, hydrocarbons such as benzene; halogenated hydrocarbons such as chloroform; dimethylformamide, and the like.

As protecting groups for the amino group in process variant (A) there can be utilized, for example, acyl residues such as the acetyl, removal of which can be effected in a known manner, for example, by mild hydrolysis. The saponification of a cyano group can be effected by treatment with alkali such as, for example, an alkali metal hydroxide.

The cleavage of a ketal group can be carried out with acidic agents, for example, mineral acids such as hydrochloric acid and the like, preferably in the presence of an organic solvent such as acetone. A ring-located keto group which may be present in the obtained reaction products can subsequently be reduced to the hydroxy group in a known manner, for example, by treatment with a complex metal hydride such as sodium borohydride, or by catalytic hydrogenation. Cis-trans isomers obtained in the reduction can then, if desired, be separated according to known methods, for example, by crystallization or by chromatography.

The compounds of formula I obtained in accordance with the invention can exist in different configurations depending on the stereochemistry of the bicyclic starting materials, for example, they can exist as the racemate or the optically active antipodes. The optically active antipodes can be separated according to known procedures. Preferred compounds of formula I are those in which R³ is lower alkylphenyl, lower alkylthiophenyl or acylamino lower alkylphenyl and, of these, especially preferred are those which are derived configuratively from DL- or D-camphor, respectively, from borneol or isoborneol.

The compounds of formula I form salts with pharmaceutically acceptable bases and such salts are also within the scope of the invention. Thus, the compounds of formula I form salts with pharmaceutically acceptable bases, which preferably include alkali metal bases, such as sodium hydroxide, potassium hydroxide and the like, and organic bases, such as trialkylamines, e.g. triethylamine.

The compounds of formula I are useful as hypoglycemic agents. Their hypoglycemic activity can be demonstrated in warm-blooded animals as described hereinafter. Female dogs, which after 1-day standard diet have been fasted for 16 hours, are utilized in groups of three for each test compound and dosage level. The test compounds are administered per os in gelatin capsules. Blood samples are taken prior to the medication and at prescribed intervals thereafter. After heparinization, the plasma is separated and its glucose content is determined according to the glucose oxidase method (Anal. Biochem. 3, 131, [1962]) in the Technicon Autoanalyzer. Four percent ox albumin solution with a known amount of glucose is used as the standard. The results obtained are statistically evaluated and calculated as percent deviation from the blank value. Positive values signify increases, negative values decreases of the plasma glucose concentration.

Utilizing the procedure set forth above, when 30μ mol. of a compound of formula I of the invention is administered, the results set forth in Table 1 are obtained:

TABLE 1

| | Compound | Hypoglycemic Activity | Time |
|---|---|---|---|
| (1R)- | 2-oxo-N-(p-tolylsulfonyl)-3-endobornanecarboxamide | −25% | after 24 hrs. |
| (1R)- | N-[{p-[2-(5-chloro-o-anisamido)-ethyl]-phenyl}-sulfonyl]-2-oxo-3-endobornanecarboxamide | −36%<br>−27% | after 2 hrs.<br>after 4 hrs. |
| (1R)- | N-{[p-(methylthio)phenyl]-sulfonyl}-2-oxo-3-endo-bornanecarboxamide | −14%<br>−16% | after 2 hrs.<br>after 4 hrs. |

The compounds of formula I can be used in the form of pharmaceutical preparations which contain them or their salts with pharmaceutically acceptable bases in admixture with a suitable pharmaceutically inert, organic or inorganic carrier such as, for example, lactose, starches, magnesium stearate, and the like. The pharmaceutical preparations can, for example, be in the form of tablets, dragees, suppositories or capsules.

The following examples further illustrate the invention. All temperatures are in degrees centigrade, unless otherwise mentioned.

EXAMPLE 1

Preparation of (1R)-2-oxo-n-(piperidinosulfonyl)-3-endobornanecarboxamide 1.6 g. of sulfamylpiperidine and 1.1 g. of triethylamine are dissolved in 10 ml. of dimethylformamide, and a solution containing 2.1 g. of D-camphorcarboxylic acid chloride in 5 ml. of benzene is added dropwise thereto over a period of 15 minutes. After stirring overnight, the solvent is removed by evaporation on the rotary evaporator. The resulting viscous oil crystallizes when added to 50 ml. of water, whereby there are obtained 2 g. of (1R)-2-oxo-N-(piperidinosulfonyl)-3-endobornanecarboxamide having a melting point of 153° (from ethanol), $[\alpha]_D + 79.2°$ (in chloroform).

EXAMPLE 2

Preparation of rac. 2-oxo-N-(p-tolylsulfonyl)-3-bornanecarboxamide 20 g. of D,L-camphor-3-carboxylic acid are heated to 100°C. with 40 ml. of tosyl isocyanate over a period of 30 minutes and maintained at this temperature for about 1 hour until the end of the evolution of $CO_2$. The reaction mixture is partitioned between 500 ml. of ether and 1 liter of 0.5-N sodium hydroxide. The aqueous alkaline extract is slowly brought to pH 5 by addition of dilute hydrochloric acid with stirring and cooling. The oily product obtained is filtered and washed with cold water. It crystallizes after being taken up in a little ether. The product is purified by first being dissolved in ethyl acetate and then being precipitated with petroleum ether. The product is subsequently recrystallized from dilute alcohol, whereby there are obtained 20 g. of rac. 2-oxo-N-(p-tolylsulfonyl)-3-bornanecarboxamide as a mixture of the endo and exo isomer having a melting point of 78°–80°.

EXAMPLE 3

Preparation of (1R)-2-oxo-N-(p-tolylsulfonyl)-3-endobornanecarboxamide

In an analogous manner to Example 2, starting from D-camphor-3-carboxylic acid there is obtained (1R)-2-oxo-N-(p-tolylsulfonyl)-3-endobornanecarboxamide having a melting point of 139°–149° (dec.) (from ethanol/water); $[\alpha]_D + 94.7°$ (in chloroform).

EXAMPLE 4

Preparation of (1R)-2-oxo-N-(p-tolylsulfonyl)-3-endobornanecarboxamide

In an analogous manner to Example 1, from D-camphor-3-carboxylic acid chloride and p-tolylsulfonamide there is obtained (1R)-2-oxo-N-(p-tolylsulfonyl)-3-endobornanecarboxamide which is identical with the product obtained in accordance with Example 3.

EXAMPLE 5

Preparation of an isomeric mixture of (1R)-2-exo-hydroxy-N-(p-tolylsulfonyl-3-endobornanecarboxamide and (1R)-2-endohydroxy-N-(p-tolylsulfonyl)-3-exobornanecarboxamide 21 g. (1R)-2-oxo-N-(p-tolylsulfonyl)-3-endobornanecarboxamide are suspended in 200 ml. of water and, after the addition of 100 ml. of 1N sodium hydroxide, dissolved by gentle heating. 8 g. of $NaBH_4$ are then introduced all at once and the reaction mixture heated on a water-bath for 2 hours. After the addition of an additional 4 g. of $NaBH_4$, the mixture is heated on a boiling water-bath for another 2 hours. The acidic ingredients are precipitated from the cooled reaction mixture with dilute acetic acid as a flocculent precipitate which, after washing with water, is again dissolved in 300 ml. of 1N NaOH and heated on a boiling water-bath for 4 hours. The precipitate obtained by acidification with acetic acid is crystallized from dilute alcohol, whereby there are obtained 12 g. of an isomeric mixture of (1R-)-2-exo-hydroxy-N-(p-tolylsulfonyl)-3-endobornanecarboxamide and (1R)-2-endo-hydroxy-N-(p-tolylsulfonyl)-3-exobornanecarboxamide which melts at 170° (from ether/petroleum ether).

EXAMPLE 6

Preparation of an isomeric mixture of (1R)-2-endo-hydroxy-N-(p-tolylsulfonyl)-3-endobornanecarboxamide and (1R)-2-exo-hydroxy-N-(p-tolylsulfonyl)-3-exobornanecarboxamide 3 g. of (1R)-2-oxo-N-(p-tolylsulfonyl)-3-endobornanecarboxamide, 50 ml. of water, 8 ml. of 1N NaOH and 0.8 g. of $NaBH_4$ are heated on a boiling water bath for 1 hour. After cooling, the mixture is acidified with dilute acetic acid. The oily product which precipitates is extracted with ethyl acetate, and the residue of the neutral-washed ethyl acetate extract is fractionally crystallized from ether-petroleum ether, whereby there are obtained 1.3 g. of an isomeric mixture of (1R)-2-endo-hydroxy-N-(p-tolylsulfonyl)-3-endobornanecarboxamide and (1R)-2-exo-hydroxy-N-(p-tolylsulfonyl)-3-exobornan carboxamide, having a melting point of 164° (from ethyl acetate/petroleum ether).

EXAMPLE 7

Preparation of (1R)-2-oxo-N-(p-tolylsulfonyl)-3-endobornanecarboxamide

A solution containing 15 g. of camphor and 4 g. of $NaNH_2$ (sodium amide) in 100 ml. of benzene is added dropwise with stirring and external ice-cooling to a solution containing 3 g. of tosyl isocycnate in 50 ml. of benzene. The reaction mixture is partitioned between ice-water and ether. Thereafter, the aqueous phase is washed with ether and acidified. After decantation of the solvent, the tarry precipitated acidic ingredients are taken up in ethyl acetate and evaporated. The residue of the ethyl acetate phase is crystallized from ethyl acetate/petroleum ether, whereby there are obtained 0.3 g. of (1R)-2-oxo-N-(p-tolylsulfonyl)-3-endobornanecarboxamide which is identical with the compound obtained in accordance with Example 3.

EXAMPLE 8

Preparation of (1R)-N-[(p-chlorophenyl)-sulfonyl]-2-oxo-3-endobornanecarboxamide In an analogous manner to Example 2, from D-camphor-3-carboxylic acid and p-chlorobenzenesulfoisocyanate there is obtained (1R)-N-[(p-chlorphenyl)-sulfonyl]-2-oxo-3-endobornanecarboxamide having a melting point of 122°–125° (from ethanol).

EXAMPLE 9

Preparation of (1R)-N-{[p-(methylthio)phenyl]-sulfonyl} -2-oxo-3-endobornanecarboxamide sodium In an analogous manner to Example 2, from D-camphor-3-carboxylic acid and p-methylthiobenzenesulfoisocyanate there is obtained (1R)-N-{[p-(methylthio)phenyl]-sulfonyl} -2-oxo-3- endobornanecarboxamide. On addition of aqueous sodium hydroxide solution to the alcoholic solution of the compound there is obtained the sodium salt having a melting point of 190°–192° (from ethanol).

EXAMPLE 10

Preparation of (1R)-N-{[p-(ethylthio)phenyl]-sulfonyl}-2-oxo-3-endobornanecarboxamide sodium In an analogous manner to Example 1, from D-camphor-3-carboxylic acid chloride and p-ethylthiobenzenesulfonamide, there is obtained (1R)-N-{[p-(ethylthio)-phenyl]-sulfonyl} -2-oxo-3 -endobornanecarboxamide. The sodium salt melts at 152°–154° (from ethanol/ether).

EXAMPLE 11

Preparation of (1R)-N-{[p-(2-acetamidoethyl)phenyl]-sulfonyl}-2-oxo-3-endobornanecarboxamide sodium In an analogous manner to Example 1, from D-camphor-3-carboxylic acid chloride and p-(acetylaminoethyl)-benzene-sulfonamide there is obtained (1R)-N-{[p-(2-acetamidoethyl)-phenyl]-sulfonyl}-2-oxo-3- endobornanecarboxamide. The sodium salt melts at 178°–180° (from ethanol).

EXAMPLE 12

Preparation of (1R)-N-(N-acetylsulfanily)-2-oxo-3-endobornanecarboxamide sodium

In an analogous manner to Example 1, from D-camphor-3-carboxylic acid chloride and p-acetylaminobenzenesulfonamide there is obtained (1R-)-N-(N-acetylsulfanilyl)-2-oxo-3-endobornanecarboxamide. The sodium salt melts at 240° (from ethanol).

EXAMPLE 13

Preparation of (1R)-2-oxo-N-sulfanilyl-3-endobornanecarboxamide sodium 40 g. of (1R)-N-(N-acetylsulfanilyl)-2-oxo-3-endobornanecarboxamide sodium are heated to reflux with 500 ml. of ethanolic hydrochloric acid for 1.5 hours. After filtration, the reaction solution is concentrated under vacuum and the residue is taken up in ethyl acetate and water. Work up of the organic phase yields 26.3 g. of an oily substance which is dissolved in 300 ml. of absolute ethanol and treated with 3 g. of sodium hydroxide dissolved in 6 ml. of water. The resulting solution is thereafter concentrated under vacuum and the residue twice distilled with absolute ethanol, whereby there is obtained (1R)-2-oxo-N-sulfanilyl-3-endobornanecarboxamide sodium, which crystallized with 0.8 mol. of ethanol and 0.2 mol. of water, melts at 214°–216°.

EXAMPLE 14

Preparation of (1R)-N-[(p-carbamolphenyl)-sulfonyl]-2-oxo-3-bornanecarboxamide sodium In an analogous manner to Example 1, from D-camphor-3-carboxylic acid chloride and 4-sulfamoly-benzoic acid amide there is obtained (1R)-N-[(p-carbamoylphenyl)-sulfonyl]-2-oxo-3-bornanecarboxamide as a mixture of the endo and exo isomers. The sodium salt crystallizes with 1 mol. of ethanol and 1 mol. of water and melts at 218°–220° (from ethanol/water).

EXAMPLE 15

Preparation of (1R)-N-[{p-]2-(5-chloro-o-anisamideo)-ethyl]-phenyl}-sulfonyl]-2-oxo-3 -endobornanecarboxamide In an analogous manner to Example 1, from D-camphor-3-carboxylic acid chloride and 4-[β-(2-methoxy-5-chloro-benzamido)-ethyl]-benzenesulfonamide there is obtained (1R)-N-[{p-[2-(5-chloro-o-anisamido)ethyl]-phenyl}-sulfonyl] -2-oxo-3-endobornanecarboxamide which crystallized with 1 mol. of ethanol and 0.5 mol. of water, melts at 108°–110° (from ethanol).

EXAMPLE 16

Preparation of (1R)-N-[(p-cyanophenyl)-sulfonyl]-2-oxo-3-endobornanecarboxamide

In an analogous manner in Example 1, from D-camphor-3-carboxylic acid chloride and p-cyanobenzenesulfamide there is obtained (1R)-N-[(p-cyanophenyl)-sulfonyl]-2-oxo-3-endobornanecarboxamide having a melting point of 163°–166° (from ethanol/water); $[\alpha]_D + 32.4°$ (in ethyl acetate).

EXAMPLE 17

Preparation of endo- and exo-isomers of (1R)-N-[(p-carbamoylphenyl)-sulfonyl]-2-oxo-3-bornanecarboxamide 10 g. of (1R)-N-[(p-cyanophenyl)-sulfonyl]-2-oxo-3-endobornanecarboxamide are dissolved in 350 ml. of acetone. The solution is treated with 150 ml. of hydrogen peroxide, brought to a pH of 10.5 –11 by the addition of concentrated sodium hydroxide solution and heated for 5 or 6 hours at reflux so that the pH of the reaction mixture, through the addition of sodium hydroxide, is maintained constant. Thereafter, the reaction mixture is evaporated under reduced pressure, the residue is suspended in water, brought to a pH of 1 with dilute hydrochloric acid and taken up in ethyl acetate. After evaporation of the solvent, the residue is crystallized from ethanol/water to yield 7.6 g. of (1R)-N-[(p-carbamoylphenyl)-sulfonyl]-2-oxo-2-bornanecarboxamide as a mixture of the endo and exo isomers, having a melting point of 168°–173°.

EXAMPLE 18

Tablets of the following composition are prepared, utilizing conventional procedures:

| | |
|---|---|
| (1R)-2-oxo-N-(p-tolylsulfonyl)-3-endobornanecarboxamide | 200 mg |
| Gelatine | 6 mg |
| Corn starch | 88 mg |
| Talc | 5 mg |
| Magnesium stearate | 1 mg |
| | 300 mg |

We claim:
1. A compound of the formula

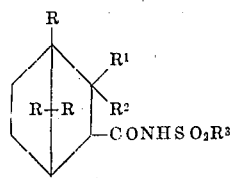

wherein the residues R are identical and are hydrogen or methyl, $R^1$ is hydrogen, $R^2$ is hydroxy, or $R^1$ and $R^2$, taken together, are the oxygen atom of a keto group, and $R^3$ is piperidinyl or pyrrolidinyl, or salts thereof with pharmaceutically acceptable bases.

2. A compound in accordance with claim 1, wherein R is methyl.

3. A compound in accordance with claim 2, wherein $R^1$ and $R^2$, taken together, are oxygen.

4. A compound in accordance with claim 2, wherein $R^1$ is hydrogen and $R^2$ is hydroxy.

5. A compound in accordance with claim 2, (1R)-2-oxo-N-(piperidinosulfonyl)-3-endobornanecarboxamide.

* * * * *

UNITED STATES PATENT OFFICE
CERTIFICATE OF CORRECTION

Patent No. 3,821,230                    Dated    June 28, 1974

Inventor(s)  Hermann Bretschneider et al.

It is certified that error appears in the above-identified patent and that said Letters Patent are hereby corrected as shown below:

Cover page, after

"[21] Appl. No.: 296,481" insert

[30] Foreign Application Priority Data

February 14, 1969    Switzerland    2257/69

June 12, 1969        Switzerland    8969/69

Signed and sealed this 11th day of March 1975.

(SEAL)
Attest:

RUTH C. MASON
Attesting Officer

C. MARSHALL DANN
Commissioner of Patents
and Trademarks